United States Patent
Sergyeyenko et al.

(10) Patent No.: US 9,980,438 B2
(45) Date of Patent: May 29, 2018

(54) SHEARING TOOL

(71) Applicant: BLACK & DECKER INC., New Britain, CT (US)

(72) Inventors: Oleksiy P. Sergyeyenko, Baldwin, MD (US); Wong Kun Ng, Cockeysville, MD (US); Kelly E. Dyer, Silver Spring, MD (US); Robert Wu, Gaithersburg, MD (US)

(73) Assignee: BLACK & DECKER INC., New Britain, CT (US)

( * ) Notice: Subject to any disclaimer, the term of this patent is extended or adjusted under 35 U.S.C. 154(b) by 0 days. days.

(21) Appl. No.: 15/493,780

(22) Filed: Apr. 21, 2017

(65) Prior Publication Data

US 2017/0223902 A1 Aug. 10, 2017

Related U.S. Application Data

(63) Continuation of application No. 14/525,324, filed on Oct. 28, 2014, now Pat. No. 9,675,011.

(51) Int. Cl.
*A01G 3/053* (2006.01)

(52) U.S. Cl.
CPC .................... *A01G 3/053* (2013.01)

(58) Field of Classification Search
CPC .......... A01G 3/053; A01G 3/037; A01G 3/04; A01G 3/06; Y10T 83/536; B26B 15/00; B25F 5/00
USPC ............. 30/216, 228, 229, 226, 227, 38, 30; 83/367
See application file for complete search history.

(56) References Cited

U.S. PATENT DOCUMENTS

| | | | |
|---|---|---|---|
| 2,225,171 | A | 12/1940 | Hammes |
| 3,347,029 | A | 10/1967 | Grinwald |
| 3,408,875 | A | 11/1968 | Briskman et al. |
| 3,611,083 | A | 10/1971 | Halsted |
| 3,961,671 | A | 6/1976 | Adams et al. |
| 4,495,456 | A | 1/1985 | Vecillo et al. |
| 4,533,800 | A | 8/1985 | Parsons |
| 4,534,390 | A | 8/1985 | Morey et al. |
| 4,609,155 | A | 9/1986 | Garnier |
| 4,611,461 | A | 9/1986 | Tyros |
| 4,793,561 | A | 12/1988 | Burda |
| 4,925,116 | A | 5/1990 | Lundell |
| 4,944,461 | A | 7/1990 | Farnsworth |
| 5,150,523 | A | 9/1992 | McCurry |
| 5,252,904 | A | 10/1993 | Nanos |

(Continued)

FOREIGN PATENT DOCUMENTS

| | | |
|---|---|---|
| EP | 2027768 | 4/2010 |
| EP | 2027767 | 11/2011 |

(Continued)

OTHER PUBLICATIONS

EP search report for Application No. EP 15191767.1 dated Mar. 22, 2016.

*Primary Examiner* — Ghassem Alie

(74) *Attorney, Agent, or Firm* — John Yun

(57) ABSTRACT

A method for operating a shearing tool that includes: operating a first switch to control a drive unit to drive a blade of a blade set; and operating a second switch to cause the drive unit to operate in an anti-binding mode in which a direction of an input to the drive unit is alternated at least twice. A shearing tool is also provided.

14 Claims, 5 Drawing Sheets

(56) References Cited

U.S. PATENT DOCUMENTS

| | | | |
|---|---|---|---|
| 5,724,737 A * | 3/1998 | Stones | B27B 17/0008 192/131 R |
| 5,867,909 A * | 2/1999 | Jeltsch | B26B 15/00 30/216 |
| 6,293,479 B1 | 9/2001 | Kaczmarski et al. | |
| 6,814,320 B1 | 11/2004 | Morey et al. | |
| 6,830,204 B1 | 12/2004 | Morey | |
| 6,886,317 B2 | 5/2005 | Jackson et al. | |
| 7,011,258 B2 | 3/2006 | O'Halloran et al. | |
| 7,044,409 B2 | 5/2006 | Stelter et al. | |
| 7,232,083 B2 | 6/2007 | Stelter et al. | |
| 7,448,563 B2 | 11/2008 | Berger et al. | |
| 7,543,434 B2 | 6/2009 | Jackson et al. | |
| 7,633,252 B2 | 12/2009 | Maue et al. | |
| 7,637,444 B2 | 12/2009 | Steller et al. | |
| 7,654,479 B2 | 2/2010 | Stelter et al. | |
| 8,523,095 B2 | 9/2013 | O'Halloran et al. | |
| 2009/0188361 A1 | 7/2009 | Simpson et al. | |
| 2011/0005088 A1* | 1/2011 | Pellenc | B27B 17/0008 30/383 |
| 2012/0017558 A1 | 1/2012 | Pellenc | |
| 2013/0025135 A1 | 1/2013 | Gejervall et al. | |
| 2015/0289451 A1* | 10/2015 | Koizumi | B25F 5/00 30/228 |

FOREIGN PATENT DOCUMENTS

| | | |
|---|---|---|
| EP | 1969919 | 1/2012 |
| GB | 2492886 | 1/2013 |
| JP | 2005269972 | 3/2004 |
| WO | WO2013023696 | 2/2013 |

* cited by examiner

SHEARING TOOL

CROSS-REFERENCE TO RELATED APPLICATION

This application claims the benefit of U.S. application Ser. No. 14/525,324 filed on Oct. 28, 2014, entitled Shearing Tool. The entire contents of U.S. application Ser. No. 14/525,324 are incorporated herein by reference.

FIELD

The present disclosure relates to a shearing tool.

BACKGROUND

This section provides background information related to the present disclosure which is not necessarily prior art.

Shearing tools, such as hedge trimmers, are commonly employed in the maintenance of landscape to trim vegetation. Such shearing tools commonly have a pair of shearing blades that can be moved relative to one another to shear a workpiece, such as a branch of a shrub. Shearing motion of the blades is commonly responsive to the operator's use of a trigger switch that is integrated into the shearing tool.

It is relatively commonplace for the shearing blades to jam on occasion, as when attempting to cut a workpiece that is relatively large in cross-sectional area or when cutting several workpieces simultaneously. In such situations, the operator of a prior art shearing tool has very limited capability to un-jam the shearing blades. For example, the operator could release and re-activate the trigger switch, but doing so would merely stop and restart the motor that provides power to the shearing blades; because the jammed workpiece is disposed between the shearing blades and the shearing blades have no additional momentum, it is unlikely that merely stopping and re-starting the motor will be effective in un-jamming the shearing blades of the shearing tool. A remaining option is to pull the workpiece out of the shearing blades, for example by tugging on the shearing tool.

A shearing tool that is disclosed in U.S. Patent Application Publication No. 2009/0188361 is configured with a control means that changes the direction of the movement of the shearing blade(s) automatically in response to an event sensed by the control means. The event could be an increase in or a high value of a cutting load or the activation of a trigger switch that is operated by the user of the shearing tool to cause the motor to operate. One problem that we have noted with this configuration concerns the inability of the control means to distinguish between a workpiece and a foreign object, such as fencing or netting. We have noted that often times it would not be desirable to attempt to cut through a foreign object that has (inadvertently) become jammed between the shearing blades. Accordingly, there remains a need in the art for an improved shearing tool having capabilities for unjamming a set of jammed shearing blades.

SUMMARY

This section provides a general summary of the disclosure, and is not a comprehensive disclosure of its full scope or all of its features.

In one form, the present teachings provide a shearing tool that includes a housing, a blade set having first and second shearing blades, a drive unit, a trigger switch, a release switch and a controller. The drive unit is received in the housing and is drivingly coupled to at least one of the first and second shearing blades. The drive unit has a motor with an output shaft that is rotatable in a first rotary direction and a second rotary direction that is opposite the first rotary direction. Rotation of the output shaft of the motor in the first rotary direction creates relative motion between the first and second shearing blades that permits the blade set to shear a workpiece. The trigger switch and the release switch are coupled to the housing. The controller is coupled to the drive unit, the trigger switch and the release switch and is configured to operate the drive unit at least partly in response to a state of the trigger switch and a state of the release switch.

In another form, the present teachings provide a method for operating a shearing tool. The method includes: operating a first switch to control a drive unit to drive a blade of a blade set; and operating a second switch to cause the drive unit to operate in an anti-binding mode in which a direction of an input to the drive unit is alternated at least twice.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
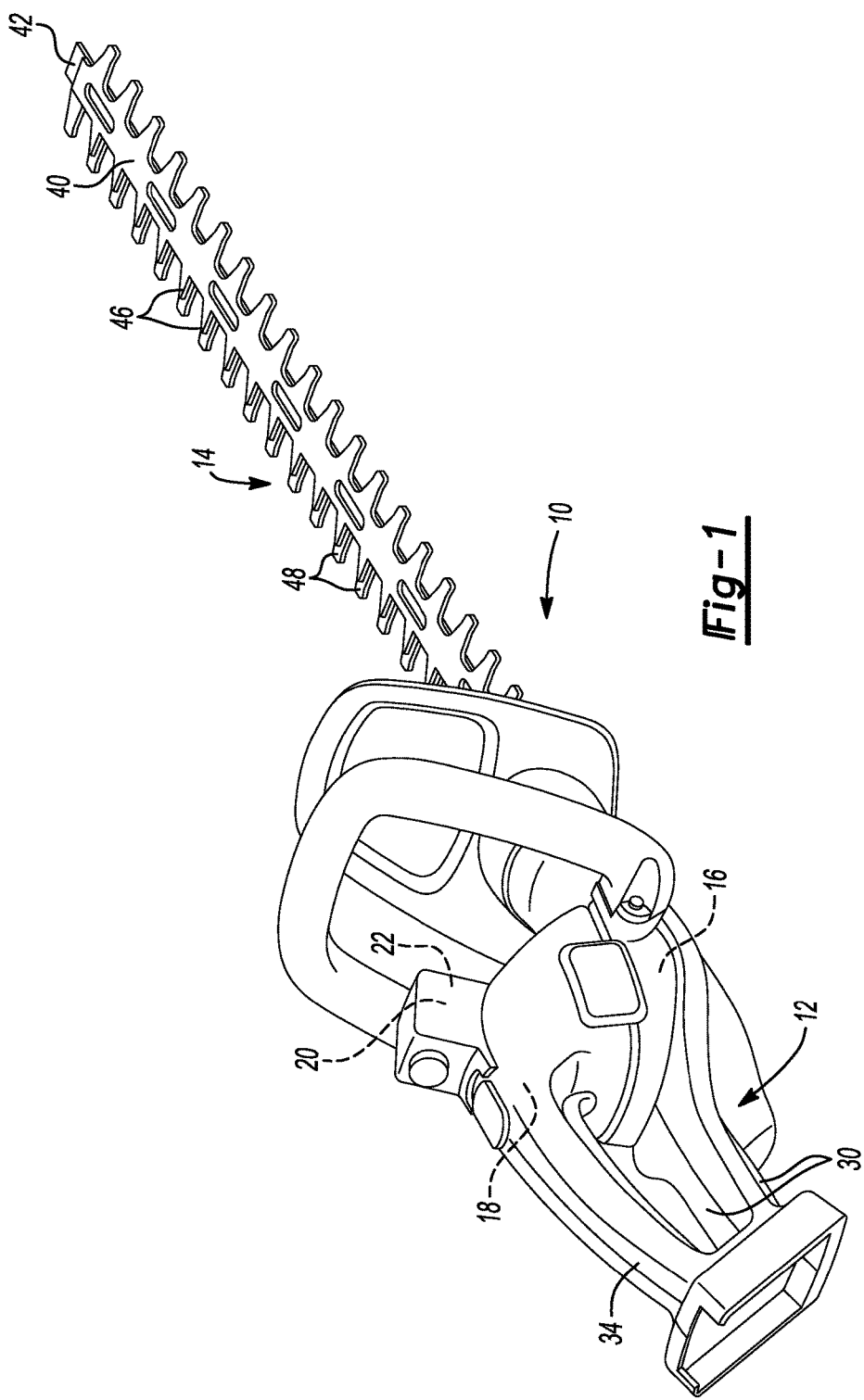
FIG. 1 is a perspective view of a shearing tool constructed in accordance with the teachings of the present disclosure.
Figure 2:
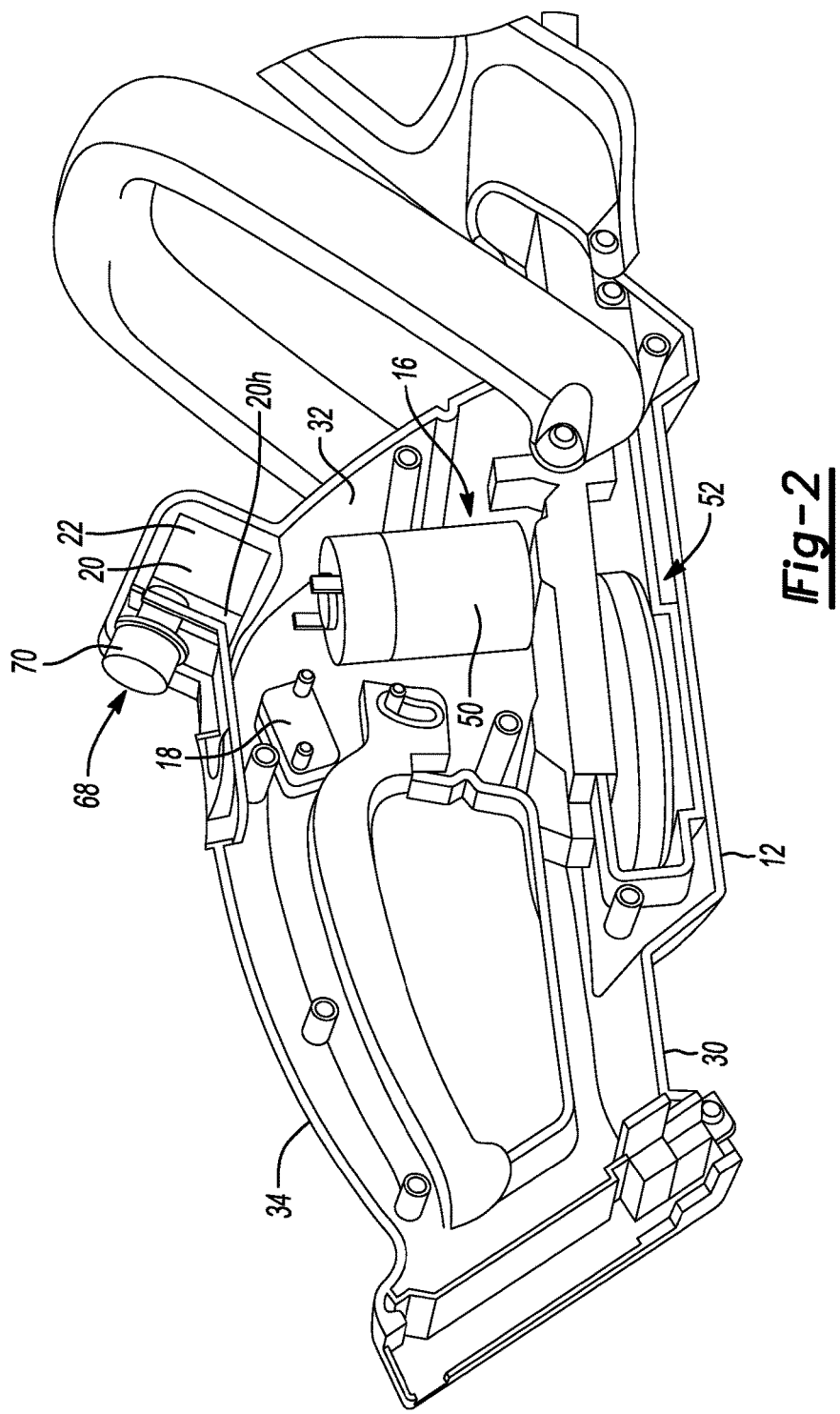
FIG. 2 is a perspective, partly broken away view of a portion of the shearing tool of FIG. 1.

With reference to FIGS. 1 and 2 of the drawings, a shearing tool constructed in accordance with the teachings of the present disclosure is generally indicated by reference numeral 10. The shearing tool 10 includes a housing 12, a blade set 14, a drive unit 16, a trigger switch 18, a release switch 20 and a controller 22. Except as described herein, the housing 12, the blade set 14, the drive unit 16 and the trigger switch 18 can be constructed and operated in a conventional and well known manner. Briefly, the housing 12 is formed of a pair of clam shell housings 30 that cooperate to define a housing cavity 32, and a handle 34. The blade set 14 comprises a first blade 40 and a second blade 42. The first blade 40 has a plurality of first shearing teeth 46, which is sharpened on a side that abuts the second blade 42, and the second blade 42 has a plurality of second shearing teeth 48, which may or may not be sharpened on a side that abuts the first blade 40. The drive unit 16 is configured to cause relative motion between the first and second blades 40 and 42 that permits the blade set 14 to shear a workpiece, such as a branch of a shrub. Relative motion between the first and second blades 40 and 42 can be accomplished by driving one or both of the first and second blades 40 and 42. In the example provided, the drive unit 16 is configured to drive the first blade 40 to cause reciprocation of the first blade 40 relative to the second blade 42 and the second blade 42 is fixedly coupled to the housing 12, but it will be appreciated that the second blade 42 could additionally or alternatively be driven by the drive unit 16. It will also be appreciated that the drive unit could be configured in the alternative to cause pivoting of the first blade 40 relative to the second blade 42.

Figure 3:
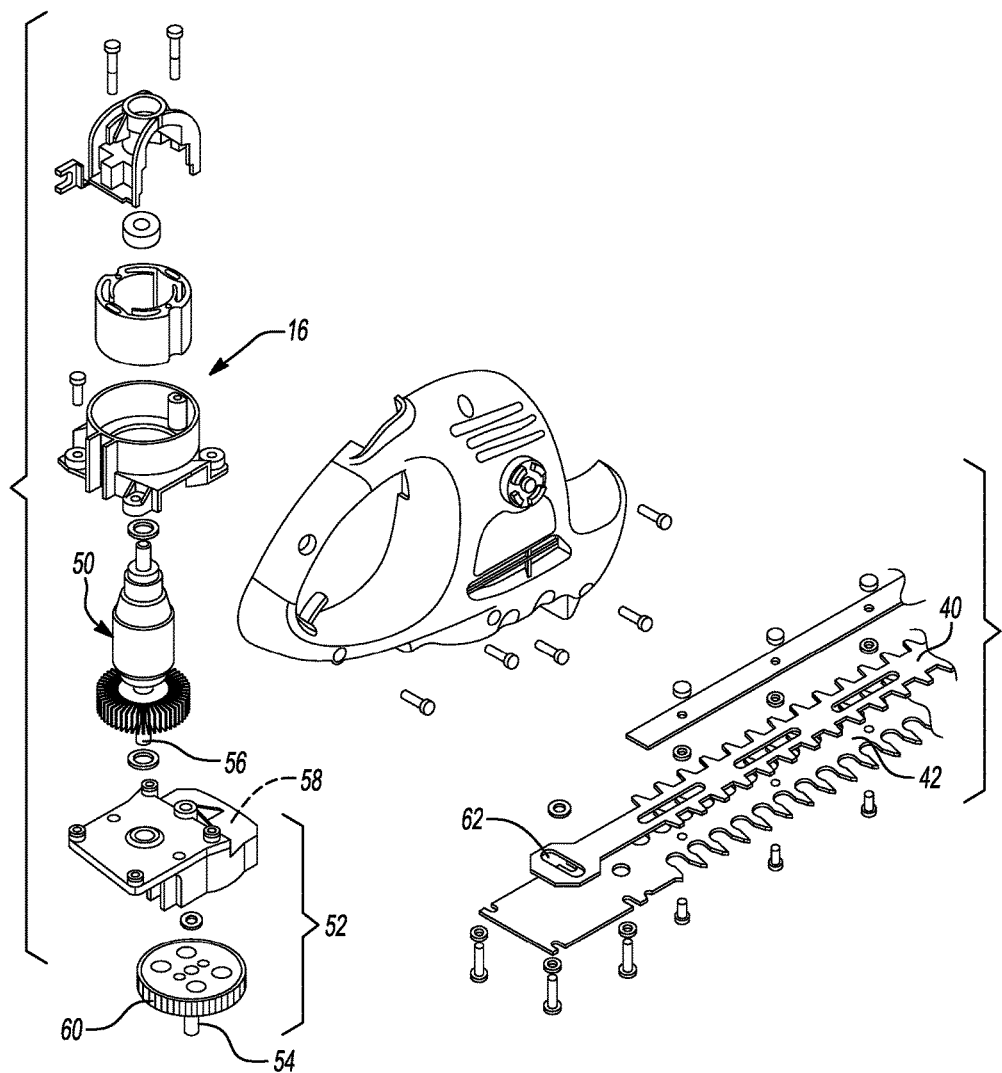
FIG. 3 is an exploded perspective view of a portion of the shearing tool of FIG. 1.

With additional reference to FIG. 3, the drive unit 16 comprises a motor 50 and a gearbox assembly 52 that has one or more output members 54. The motor 50 is a rotary motor having an output shaft 56 that is configured to provide rotary power to the gearbox assembly 52. The gearbox assembly 52 includes a gearbox housing 12, which is fixedly but removably coupled to the housing 12, and a geartrain 58 that drives the output member(s) 54. In the particular example provided, a single output member 54 is employed and the output member 54 is a pin that is mounted to an output gear 60 of the geartrain 58 at a location that is radially outward of the rotational axis of the output gear 60 so that rotation of the output gear 60 will cause corresponding orbiting of the pin about the rotational axis of the output gear 60. The pin is received into a transverse slot 62 formed in the first blade 40. The first blade 40 is mounted to the second blade 42 in a manner that permits translation of the first blade 40 about its longitudinal axis and inhibits translation of the first blade 40 in the lateral or transverse direction. Accordingly, during orbiting motion of the pin about the rotational axis of the output gear 60, the pin will reciprocate in the transverse slot 62 in the first blade 40 and will cause will cause the first blade 40 to reciprocate along the longitudinal axis of the first blade 40 relative to the second blade 42.

Returning to FIGS. 1 and 2, the trigger switch 18 is configured to receive a manual input from a finger of an operator of the shearing tool 10 and to responsively provide an output that is employed by the controller 22 to control the operation of the motor 50. The trigger switch 18 has a first trigger switch state in which the trigger switch 18 is configured to provide a first trigger switch signal, and a second trigger switch state in which the trigger switch 18 is configured to provide a second trigger switch signal. In one form, the first and second trigger switch signals are associated with discrete voltages that are applied over a conductor that couples the trigger switch 18 and the controller 22. In the particular example provided, however, the trigger switch 18 is a variable speed switch, and the controller 22 is configured to control the supply of electrical power to the motor 50 using a pulse-width modulation technique.

The release switch 20 is mounted to the housing 12 and is operable in a first release switch state, in which the release switch 20 is configured to provide a first release switch signal, and a second release switch state in which the release switch 20 is configured to provide a second release switch signal. The state of the release switch 20 is responsive to the actuation of a switch actuator 68. In the particular example provided, the switch actuator 68 is coupled to the housing 12 for movement between a first actuator position, which is associated with operation of the release switch 20 in the first release switch state, and a second actuator position that is associated with operation of the release switch 20 in the second release switch state. The switch actuator 68 can include a button 70 that can be positioned in any desired location on the housing 12, such as in a location where it can be pressed by the thumb of the hand of an operator of the shearing tool 10 that is used to operate the trigger switch 18. In the particular example provided, the switch actuator 68 prevents over-travel of the contacts of the release switch 20 (through contact between the switch actuator 68 and another suitable structure, such as a housing 20h of the release switch 20), but it will be appreciated that the release switch 20 could be configured and positioned so that it can be directly operated by the operator of the shearing tool 10.

The controller 22 is coupled to the drive unit 16, the trigger switch 18 and the release switch 20 and is configured to operate the drive unit 16 at least partly in response to a state of the trigger switch 18 and a state of the release switch 20. More specifically, the controller 22 is configured to receive signals provided by the trigger switch 18 and the release switch 20 and to responsively operate the motor 50 of the drive unit 16.

The trigger switch 18 provides a first trigger switch signal when the trigger switch 18 not activated (i.e., in the first trigger switch state) and provides a second trigger switch signal when the trigger switch 18 is activated (i.e., in the second trigger switch state). The controller 22 is configured such that upon receipt of the first trigger switch signal (and either the first release switch signal or the second release switch signal), the controller 22 responsively operates the drive unit 16 to inhibit the supply of electrical power to the motor 50 that would cause rotation of the motor 50 in either rotational direction. Accordingly, the controller 22 is configured to control the drive unit 16 such that the drive unit 16 will not cause corresponding reciprocating motion of the first blade 40 relative to the second blade 42 when the controller 22 receives the first trigger switch signal from the trigger switch 18.

The controller 22 is also configured such that upon receipt of the second trigger switch signal (and the first release switch signal), the controller 22 responsively controls the operation of the drive unit 16 to cause rotation of the motor 50 in the first rotational direction to cause corresponding reciprocating motion of the first blade 40 relative to the second blade 42. Accordingly, the controller 22 is configured to control the drive unit 16 such that the motor 50 of the drive unit 16 will rotate in the first rotational direction to cause corresponding reciprocating motion of the first blade 40 relative to the second blade 42 when the controller receives the second trigger switch signal from the trigger switch 18 and the first release switch signal from the release switch 20.

The controller 22 is further configured to operate the drive unit 16 in an anti-binding mode in response to receipt of the second trigger switch signal and the second release switch signal. When the drive unit 16 is operated in the anti-binding mode, the motor 50 is alternately driven in the first and second rotary directions in a predetermined manner provided that the state of the trigger switch 18 is maintained in the second trigger switch state. The controller 22 terminates operation of the drive unit 16 in the anti-binding mode after the occurrence of one of a plurality of predetermined termination events. The predetermined termination events could comprise, for example: a) a change in the state of the trigger switch 18 to the first trigger switch state, b) a change in the state of the release switch 20 from the second release switch state to the first release switch state, c) the elapse of a predetermined amount of time, d) completion of an anti-binding control routine, or e) in response to determining that the load on the drive unit 16 that is associated with driving the blade set 14 has dropped below a predetermined threshold.

Figure 4:
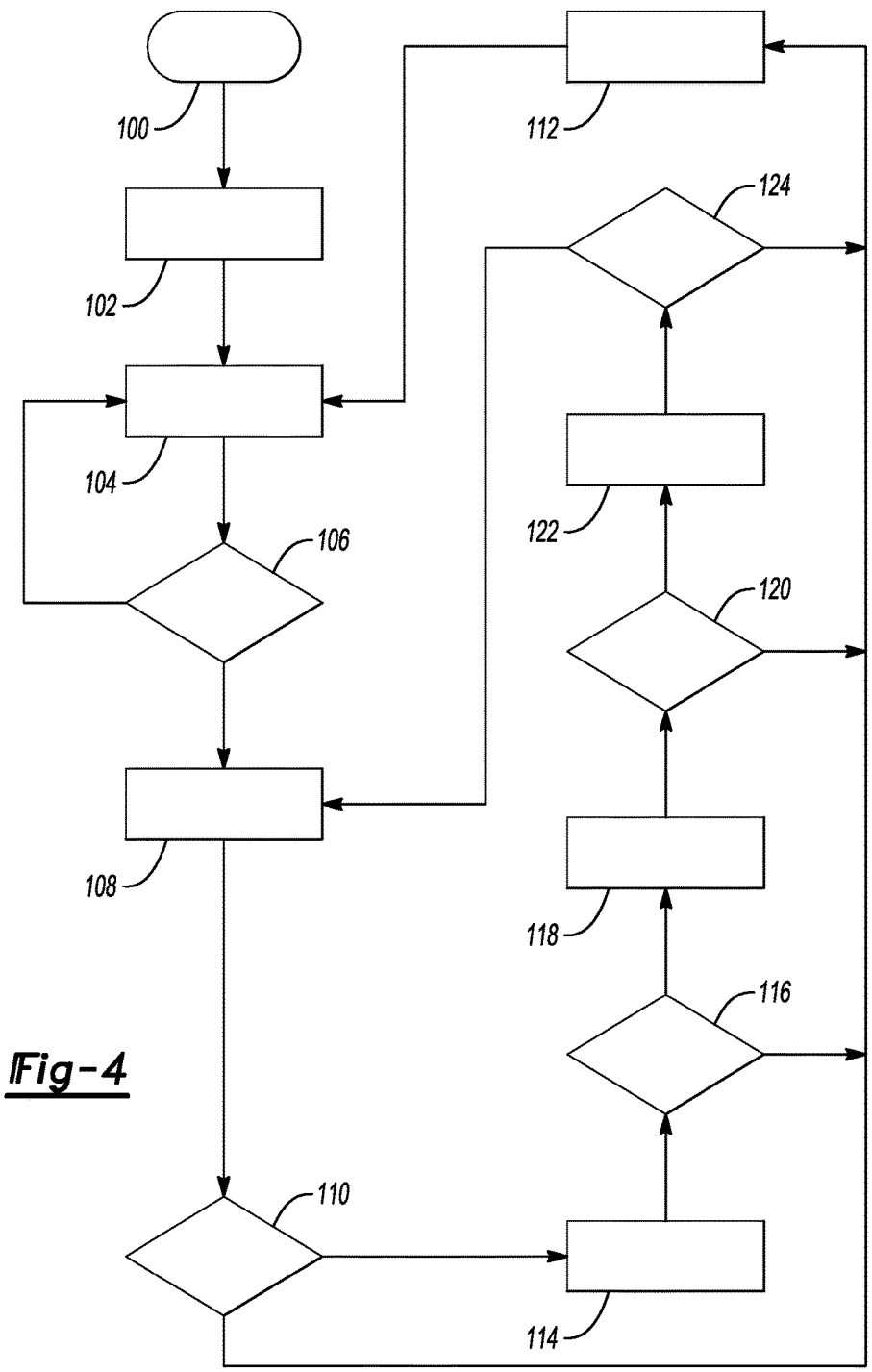
FIG. 4 is a schematic illustration in flowchart form of a method for operating the shearing tool of FIG. 1.

With additional reference to FIG. 4, a method for operating the drive unit 16 is schematically illustrated in flowchart form. The method proceeds from a start bubble 100 to block 102 where the state of the release switch 20 is the first release switch state and the state of the trigger switch 18 changes from the first trigger switch state to the second trigger switch state, which causes the controller 22 to operate the drive unit 16 such that the motor 50 rotates in the first rotational direction. Control proceeds to block 104 where the controller 22 updates the pulse-width modulation parameters for powering the motor 50 in the first rotational direction. Control proceeds to decision block 106.

In decision block 106, control determines if the state of the release switch 20 has changed from the first release switch state to the second release switch state. If the state of the release switch 20 has not changed to the second release switch state, control loops back to block 104. If, however, the state of the release switch 20 has changed in decision block 106, control proceeds to block 108 to operate the drive unit 16 in the anti-binding mode.

In block 108 control halts operation of the motor 50 for a predetermined length of time, such as 60 milliseconds. Control proceeds to decision block 110, where control determines if an anti-binding mode termination event has occurred. The anti-binding mode termination event can be selected from a plurality of predetermined termination events, such as a predetermined maximum time of continuous operation of the anti-binding mode (e.g., a time that is greater than or equal to 840 milliseconds), the occurrence of a predetermined quantity of reversals in the rotational direction in which the motor 50 is operated, and/or a change in the state of the trigger switch 18 (to the first trigger switch state). Optionally, the plurality of predetermined termination events can comprise a change in the state of the release switch 20 (to the first release switch state). If control determines that one or more of the predetermined termination events has occurred, control proceeds to block 112 where the anti-binding mode terminates. Control loops back to block 104.

Figure 5:
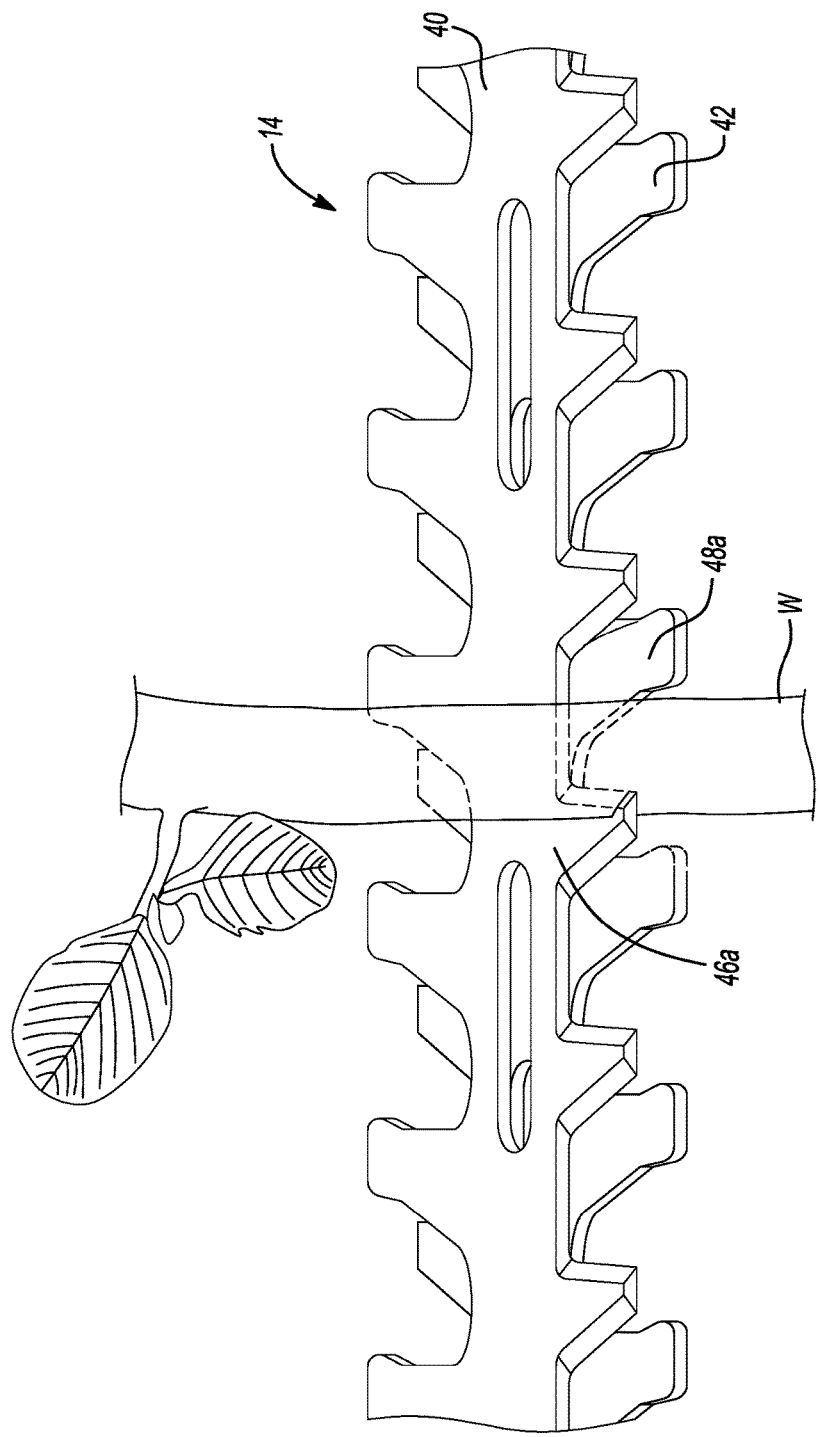
FIG. 5 is a perspective view of a portion of the shearing tool of FIG. 1 depicting a workpiece lodged between first and second shearing blades of a blade set.

Returning to decision block 110, if control determines that none of the predetermined termination events has occurred, control proceeds to block 114, where control operates the motor 50 in the second rotational direction at a predetermined speed, such as at a maximum speed, for a predetermined length of time, such as 150 milliseconds. It will be appreciated that reversing the direction of the rotation of the motor 50 will reverse the direction in which the first blade 40 is driven relative to the second blade 42 to thereby separate the first and second shearing teeth 46a and 48a (FIG. 5) that are located on opposite sides of the workpiece W (FIG. 5) that was responsible for the jammed condition of the blade set 14. The workpiece W (FIG. 5) can be extracted from the first and second blades 40 and 42 at this point if the user of the shearing tool 10 opts against further attempts to cut through the workpiece W (FIG. 5).

Control proceeds to decision block 116, where control determines if an anti-binding mode termination event has occurred. If control determines that one or more of the predetermined termination events has occurred, control proceeds to block 112 where the anti-binding mode terminates. Returning to decision block 116, if control determines that none of the predetermined termination events has occurred, control proceeds to block 118, where control halts operation of the motor 50 for a predetermined length of time, such as 60 milliseconds.

Control proceeds to decision block 120, where control determines if an anti-binding mode termination event has occurred. If control determines that one or more of the predetermined termination events has occurred, control proceeds to block 112 where the anti-binding mode terminates. Returning to decision block 120, if control determines that none of the predetermined termination events has occurred, control proceeds to block 122, where control operates the motor 50 in the first rotational direction at a predetermined speed, such as at a maximum speed, for a predetermined length of time, such as 150 milliseconds. It will be appreciated that reversing the direction of the rotation of the motor 50 will reverse the direction in which the first blade 40 is driven relative to the second blade 42 to thereby drive the first and second shearing teeth 46 and 48 toward one another in an attempt to cut through the workpiece W (FIG. 5).

Control proceeds to decision block 124, where control determines if an anti-binding mode termination event has occurred. If control determines that one or more of the predetermined termination events has occurred, control proceeds to block 112 where the anti-binding mode terminates. Returning to decision block 124, if control determines that none of the predetermined termination events has occurred, control loops back to block 104.

While the method has been described as employing a timer that is employed as one possible condition for terminating the anti-binding mode, it will be appreciated that a method in accordance with the teachings of the present disclosure need not employ such a timer. Rather, the method could be configured to progress through a predetermined quantity of discrete steps as a prerequisite for normally terminating the anti-binding mode. For example, the method could be configured to alternate a direction of an input to the drive unit 16 at least twice. It will also be appreciated that while the methodology has been illustrated and described as including discrete steps at which control determines whether or not an anti-binding mode termination event has occurred, the methodology could be configured such that control determines on a more frequent basis (e.g., at regular and relatively more frequent intervals or on a continuous basis) whether an anti-binding mode termination event has occurred.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

| Listing of Elements | |
|---|---|
| shearing tool | 10 |
| housing | 12 |
| blade set | 14 |
| drive unit | 16 |
| trigger switch | 18 |
| release switch | 20 |
| controller | 22 |
| clam shell housings | 30 |

-continued

| Listing of Elements | |
| --- | --- |
| housing cavity | 32 |
| handle | 34 |
| first blade | 40 |
| second blade | 42 |
| first shearing teeth | 46 |
| second shearing teeth | 48 |
| motor | 50 |
| gearbox assembly | 52 |
| output member(s) | 54 |
| output shaft | 56 |
| geartrain | 58 |
| output gear | 60 |
| transverse slot | 62 |
| switch actuator | 68 |
| button | 70 |

The invention claimed is:

1. A method for operating a shearing tool comprising:
providing a shearing tool with a housing with a blade set having first and second blades, a motor drivingly coupled to the blade set so that at least one of the first and second blades move in reciprocal motion, the motor having an output shaft that is rotatable in a first rotary direction and a second rotary direction that is opposite the first rotary direction, a first switch positioned on the housing and a second switch positioned in close proximity to the first switch so that both switches are operable using a single hand, and a controller configured to operate the motor in response to a state of the first switch and the second switch;
actuating the first switch to rotate the motor in the first rotary direction; and
actuating the first and second switch to cause the motor to enter an anti-bind mode where the motor alternatively rotates in the first and second rotary directions, and the anti-bind mode is only entered upon simultaneous actuation of the first and second switch.

2. The method of claim 1, further comprising the step of releasing the second switch, whereupon the motor exits the anti-bind mode.

3. The method of claim 1, further comprising the step of releasing the second switch, whereupon the motor continues in anti-bind mode and exits anti-bind mode upon a predetermined termination event.

4. The method of claim 3, wherein the predetermined termination event is a predetermined length of time.

5. The method of claim 3, wherein the predetermined termination event is where the rotary direction of the motor is alternated a predetermined quantity of discrete times.

6. A method for operating a shearing tool comprising:
providing a shearing tool having a housing, the housing having a handle thereon, a first switch located on a first side of the handle, and a second switch located on a second side of the handle, a first blade and a second blade extending out from a front portion of the housing, and a motor operatively connected to at least one of the first blade and second blade;
actuating the first switch to rotate the motor in a first direction; and
actuating the second switch, while continuing to actuate the first switch, to cause the motor to operate in an anti-binding mode and rotate the motor in a second direction opposite the first direction, wherein the anti-bond mode is only actuated when both the first switch and the second switch are simultaneously actuated.

7. The method of claim 6, wherein operation of the drive unit in the anti-binding mode is terminated after the occurrence of one of a plurality of predetermined termination events.

8. The method of claim 7, wherein the plurality of predetermined termination events comprises completion of an anti-binding control routine.

9. The method of claim 8, wherein completion of the anti-binding control routine occurs when the drive unit has been operated in the anti-binding mode for a predetermined length of time.

10. The method of claim 8, wherein completion of the anti-binding control routine occurs when the direction in which the blade is moved is alternated a predetermined quantity of discrete times.

11. The method of claim 7, wherein the plurality of predetermined termination events comprises a change in a state of the first switch.

12. The method of claim 6, wherein the first switch is located on a bottom portion of the handle, and the second switch is located on a top portion of the handle.

13. The method of claim 12, wherein the second switch is located forward of the first switch.

14. The method of claim 6, further comprising the step of releasing the second switch and causing the motor to return to rotating in the first direction.

* * * * *